Nov. 25, 1930.　　F. R. REIFSNYDER　　1,782,631
SHOCK ABSORBER
Filed Nov. 6, 1928
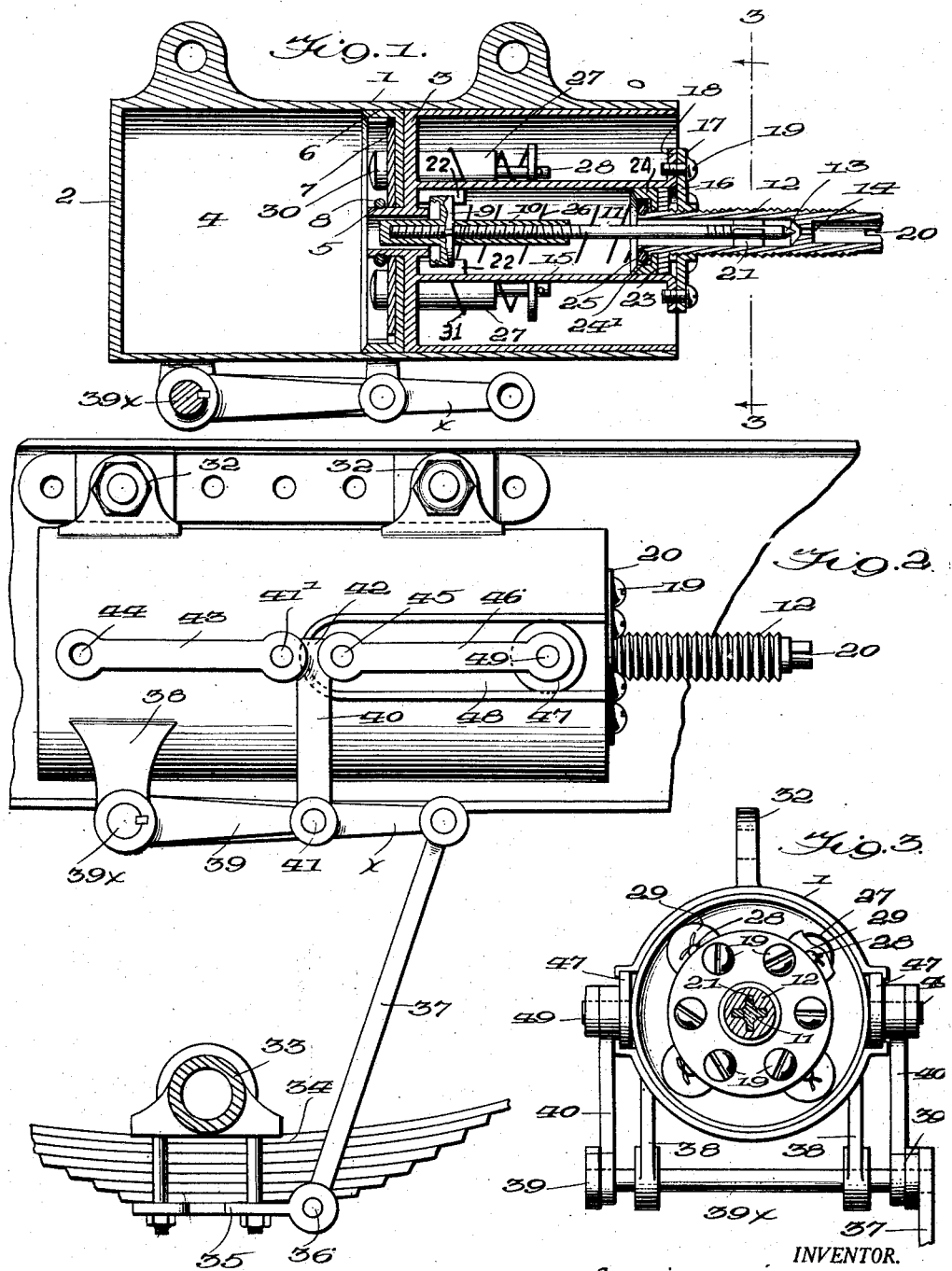
INVENTOR.
Frederick R. Reifsnyder
BY
O'Neill & Bunn
ATTORNEYS Patented Nov. 25, 1930

1,782,631

UNITED STATES PATENT OFFICE

FREDERICK R. REIFSNYDER, OF PITTSBURGH, PENNSYLVANIA

SHOCK ABSORBER

Application filed November 6, 1928. Serial No. 317,565.

This invention relates to shock absorbers, and more particularly to the provision of devices of this character especially adapted for use on automobiles or similar vehicles.

The primary object of the invention is the provision of a shock-absorber utilizing free air as the cushioning medium, in combination with certain mechanical instrumentalities so connected to a relatively movable support and to a relatively fixed support, that, under movement of the former, the air may be automatically compressed within the body of the shock absorber, and automatically expressed therefrom by movement of said support in a reverse direction.

Other objects of the invention will be made apparent in the following specifications when read in connection with the accompanying drawings forming a part thereof.

In said drawings:—

Fig. 1 is a vertical section taken longitudinally through a shock-absorber embodying my invention.

Fig. 2 is a side elevation of the shock absorber showing its connection to springs and axle and chassis of an automobile, and, Fig. 3 is an end view of the shock absorber, partly in section on the line 3—3 of Fig. 1.

Now referring specifically to the drawings, in which like reference numerals indicate like parts throughout the several views, 1 is the cylindrically-formed casing of a shock absorber embodying my invention, said casing having a closed end 2, and provided with a plunger 3 longitudinally reciprocable therein, thereby forming a compression chamber 4 in the front end of the casing 1. The plunger 3 is formed with a centrally-positioned, hollow hub portion 5, permitting the passage of air out of the chamber 4, a cupped leather washer disk 7 bearing against the front face of the washer, and a spring ring 8, seated in a peripheral groove on the hub 5, serving to retain the disk 7 and the washer 6, in correct position.

The rear end of the elongated hub 5 serves as a seat for a valve 9 adapted to control the passage of air through the aperture in said hub. The valve 9 is provided with a rearwardly extending, internally screw-threaded tube 10, into which telescopes an exteriorly screw-threaded valve rod 11 extending longitudinally within an exteriorly-screw-threaded stem 12, the rod 11 terminating in a tapered end 13, operating as a valve adapted to open and close a port 14 in the end of the stem 12. In view of the foregoing, it is obvious that a movement of the plunger 3, towards the end 2 of the casing 1, will compress air in the chamber 4 and cause pressure to be communicated to the valve 9 tending to force it from its seat, such movement of the valve however also tending to move the end 13 of the rod 11 towards the port 14.

Concentrically secured to the rear face of the plunger 3, and preferably integral therewith, is a supplemental compression chamber, hereinafter called a barrel 15. A metal plate 16 surrounds the rear end of the barrel, having its flanges 17 secured to flanges 18 formed on the barrel, by means of bolts 19, said plate 16 being provided with a centrally-located, screw-threaded aperture adapted to operatively receive the screw threads on the stem 12. The extreme end of the stem 12 is bifurcated at 20, to receive a tool adapted to forcibly rotate the stem, whereby, through the co-operating screw threads, to force it forwardly or rearwardly within the barrel 15. as clearly illustrated in Figs. 1 and 3 however, laterally-extending lugs 21 are provided on the surface of the rod 11, fitting into slots in the stem 12, so that any rotation of the stem 12 will rotate the rod and, since the latter is in operative screw-threaded engagement with the tube 10, cause the rod to move longitudinally of said tube, thereby retaining the normal distance between the end 13 of the rod and the port 14. Furthermore lugs 22 are also provided on the inner face of the front end of the barrel 15, fitting into slots in the periphery of the valve 9, whereby to prevent rotation of said valve when the stem 12 is rotated as described.

Near the front end of the stem 12, within the barrel 15, is carried a peripheral flange 23, and a cupped leather washer 24 is firmly held against the flange 23 by means of a metal disk 24′, which bears against said washer, and which is in turn retained in position by means of a spring ring 25 pressing against said disk and seated in a groove on the periphery of the end of the stem 12.

The purpose of the structure just described is to permit a variation of the internal cubical content of the barrel 15. It will of course be understood that as the air pressure increases in cylinder 4, it will coincidently, when the tension is in excess of valve seating spring 26, open valve 9 and close valve 13, barrel 15 receiving, relative movement of plunger 3, a varying portion of the compressed air from cylinder 4. Illustrative of the function of the correlated automatically adjustable valves 9 and 13, let it be presumed that plunger 3 has been suddenly advanced to and maintained at a certain point. The increased air pressure in cylinder 4 will open and close respectively the correlated automatically adjustable valves 9 and 13, permitting of equalization of air pressure within the cylinder 4 and barrel 15. The correlated automatically adjustable valves 9 and 13 will then respectively close and open, due to tension of spring 26, exhausting part of the compressed air from barrel 15. This oscillation of the correlated automatically adjustable valves 9 and 13 would eventually reduce the tension in both the cylinder 4 and barrel 15 to atmospheric pressure with valve 9 closed. In practice, however, the aforesaid presumption does not prevail. When shock or rebound has been overcome, the vehicle spring will move to its normal position, which through the coacting mechanism shown, carries plunger 3 therewith reducing the tension in cylinder 4 which would fall below zero if not relieved by the valves 30.

Surrounding the tube 10, and rod 11, and bearing against the rear face of the valve 9, and the washer 24, is a light coiled spring 26, tending at all times to retain the said valve in closed position.

Mounted at spaced intervals upon plunger 3, either integral therewith or secured thereto is a plurality of vacuum relief ports 27 having formed on its forward end a valve seat for valve 30, each of the plurality of valves 30 having thereon a stem 28, projecting rearwardly and longitudinally slidable through a fixed guide within vacuum relief ports 27, 29 is a spring seat washer or disk secured to valve stem 28 by cotter pin shown. A coiled spring 31 surrounds each vacuum relief port 27 and, seated under the disk 29, its tension will maintain valve 30 in a closed relation to its seat formed on the forward end of vacuum relief port 27.

Following a shock rebound plunger 3 having thereby been advanced toward the forward end of compression chamber 4, the concomitant rearward movement of plunger 3 will obviously tend to cause a vacuum within the compression chamber 4, so that, when the air tension within cylinder 4 falls below atmospheric pressure or tension, then will atmospheric pressure or tension open or lift valve 30 from its seat formed on the forward end of vacuum relief port 27, air, under atmospheric pressure or tension, entering to relieve the vacuum within cylinder 4, which is thus charged with atmospheric air for subsequent compression on the forward stroke of the plunger 3.

The shock absorber is provided with lugs 32 adapted to be secured to a relatively fixed resistance such as a vehicle chassis, and with means, to be now described, for connecting the plunger 3 to a relatively movable resistance, such as the running gear of an automobile or other vehicle. In Fig. 2 the numeral 33 represents a vehicle axle, and 34, one of the vehicle springs. A clip member 35 surrounds the spring 34, and carries a clevis 36 to which is secured a connecting rod 37. Non-rotatably connected to a shaft 39X which is rotatably mounted in lugs 38, carried by the shock absorber casing 1, is an arm X also pivoted to the upper end of the rod 37. Arms 39 are also non-rotatably connected to shaft 39X and have synchronous movement with arm X, shaft 39X being rotatably mounted in lugs 38. A vertically-extending drag link 40 is pivoted to said arm 39 at 41, said link being provided with a T head 42, one branch of which is connected at 41' to a link 43, pivotally mounted at 44 to the shock absorber casing 1, the other branch of the T head 42 being pivotally connected at 45, to a link 46 extending in parallelism with the link 43. The rear end of the link 46 is equipped with a pulley-shaped anti-friction roller 47, mounted on a track formed by the edges of a slot 48 cut through and extending longitudinally of the shock absorber casing 1, said roller being journaled on a trunnion 49 secured to and extending laterally of the plunger 3, through said slot 48.

As shown clearly in Fig. 3, the connections referred to are provided on both sides of the casing 1, but, since they are identical in construction and operation, a description of those on one side will suffice.

From the foregoing the operation of the shock absorber should be clear. In the embodiment of the invention here illustrated as applied to an automobile, when the vehicle wheel descends into a concavity in the highway, the rod 37 is pulled downwardly, resulting in a downward movement of the outer end of the arm X pivotally connected thereto. Such movement causes the arm X to carry arm 39 with it, through shaft 39X, to which they are fixedly keyed or otherwise secured, coincidently causing point 41 of the drag link 40 to describe an arc, curved downwardly and to the left, resulting in a downward movement of the pivot point 45, such movement necessarily being in an arc of a circle however and around the pivotal points 41' and 44; with the result that the pivot 45 must move downwardly and to the left and pull the roller 47 towards the left of the slot 48. Since the rollers are connected to the trunnions 49 of the plunger 3, the latter will be drawn forwardly into the chamber 4 of the casing 1 compressing the air therein contained. It is manifest that the subsequent upward movement of the vehicle wheels, in returning to normal position on the highway, would reversely operate the linkage just described and draw the plunger rearwardly in the casing 1, operating to increase the capacity up to its maximum as a limit of the chamber 4 and tending to form a vacuum therein, dependent upon the extent of movement of the plunger 3.

As the air within the compression chamber 4 becomes compressed to a certain extent under the forward movement of the plunger, such pressure is communicated to the face of the valve 9 exposed to said compression through the port 5, and tends to unseat said valve against the action of the spring 26. When the valve 9 is unseated however it moves rearwardly in the barrel 15 and causes the valve 13 to close, more or less of the air thus compressed passes into and is retained within the barrel 15 and if plunger 3 were stopped and maintained in this advanced position within the barrel, the compressed air in both barrel 15 and chamber 4 would, by coincident oscillations of valves 13 and 9, gradually be exhausted to atmospheric pressure but, in practice, plunger 3 will never be so maintained in advanced position within chamber 4 but will quickly return to its normal structural position, valve 13 through port 14 exhausting barrel 15 to atmospheric pressure and any vacuum in chamber 4 will be relieved by the plurality of air valves 30.

As the plunger 3 is projected forwardly into the chamber 4, under very violent descent of the vehicle wheels, the compression in said chamber becomes very high, and results in an immediate opening of the valve 9, forcing it rearwardly to an extent sufficient to cause the valve 13 to close the port 14, the shock being absorbed however in the forward compressing movement of the plunger 3, as will be understood. Immediately upon the return movement of the vehicle wheels towards level ground however, a rearward movement of the plunger will be initiated, reducing the pressure in chamber 4, and, since the pressure in the barrel 15 at this time is substantially the same as in the chamber 4, the balancing forces will cause the valve 9 to move towards its seat and re-open the port 14, whereupon the pressure in the chamber 4 and the barrel 15 will be dissipated, as hereinbefore explained.

Under certain traffic conditions, such as traveling over notoriously bad roads, or with vehicles of great weight, it is desirable to regulate the cubical content of the barrel 15, so that a higher compression may be reached in the chamber 4, under a given movement of the plunger 3. In such adjustment a suitable tool may be applied in a slot 20, on the end of the stem 12, to rotate the latter and advance the washer 24 towards the valve 9, the rod 11 being simultaneously turned by the lugs 21, and similarly entering the tube 10, to insure the maintenance of the required distance between the valve 13 and port 14. By properly adjusting the position of the washer 24, a pressure of 300 lbs. per square inch may be built up in the chamber 4, in an embodiment of the invention as here illustrated.

In view of the foregoing it will be observed that I have provided a shock absorber adapted to cushion the shock to the relatively fixed resistance during all changes in position of the relatively movable resistance. Modifications of the structure herein disclosed may be suggested to those skilled in the art, but my invention covers all embodiments falling fairly within the scope of the appended claims.

I claim:—

1. A shock absorber comprising a cylinder adapted for connection to a relatively fixed support, a plunger slidable within said cylinder and provided with a port adapted to permit the passage of air therethrough, a barrel carried by the rear face of the plunger and provided with an exhaust port in its rear portion, a valve reciprocably mounted in said barrel and adapted for movement to open or close the port in said plunger, means carried by the valve adapted, under the reciprocations of the latter, to open or close said exhaust port, and means for operatively connecting said plunger to a relatively movable support.

2. A shock absorber comprising a cylinder adapted for connection to a relatively fixed support, a plunger slidable within said cylinder and provided with a port adapted to permit the passage of air therethrough, a barrel carried by the rear face of the plunger and provided with an exhaust port in its rear portion, a valve reciprocably mounted in said barrel and adapted for movement to open or close the port in said plunger, a stem carried by the valve and adapted, under the reciprocations of the latter, to open or close said exhaust port, and means for operatively connecting said plunger to a relatively movable support.

3. A shock absorber comprising a cylinder adapted for connection to a relatively fixed support, a plunger slidable within said cylinder and provided with a port adapted to permit the passage of air therethrough, a barrel mounted on the rear face of said plunger, and having its front end enclosing said port, said barrel being provided with an exhaust port at its rear end, a valve structure reciprocably mounted in said barrel and provided with means adapted to control the passage of air through both said ports, and means operatively connecting said plunger to a relatively movable support.

4. A shock absorber comprising a cylinder adapted to be secured to a relatively fixed support, a plunger slidable within said cylinder, and provided with a port adapted to permit the passage of air, a barrel carried by the rear face of the plunger and, at one end, in communication with said cylinder through said port, said barrel carrying an exhaust port in its other end, means in said barrel, responsive to varying air pressure, adapted for movement to control the passage of air through said ports, and means operatively connecting said plunger to a relatively movable support.

5. A shock absorber comprising a cylinder adapted to be secured to a relatively fixed support, a plunger slidable within said cylinder and provided with a port adapted to permit the passage of air, a barrel carried by the rear face of the plunger and, at one end, in communication with said cylinder through said port, said barrel carrying an exhaust port in its other end, a valve reciprocably mounted in said barrel and adapted, under varying air pressure in the cylinder and barrel, for movement to control the passage of air through the port in said plunger, a stem carried by the valve and adapted to open and close said exhaust port, and means operatively connecting said plunger to a relatively movable support.

6. A shock absorber comprising a cylinder adapted for connection to a relatively fixed support, a plunger slidable within said cylinder and provided with a port adapted to permit the passage of air therethrough, a barrel carried by the rear face of said plunger and in communication with said port at its front end and having an exhaust port at its rear end, means in said barrel, actuated by varying air pressures, adapted to control the passage of air through said ports, a plurality of air valves extending through said plunger and adapted, under air pressures applied to the rear of the plunger, for movement to permit the passage of air through the latter, and means operatively connecting said plunger to a relatively movable support.

7. A shock absorber comprising a cylinder adapted for connection to a relatively fixed support, a plunger slidable within said cylinder and provided with a port adapted to permit the passage of air therethrough, a barrel carried by the rear face of said plunger and in communication with said port at its front end and having an exhaust port at its rear end, means in said barrel, actuated by varying air pressures, adapted to control the passage of air through said ports, a plurality of air valves extending through said plunger and adapted, under air pressures applied to the rear of the plunger, for movement to permit the passage of air through the latter, resilient means normally retaining said air valves in closed position, and means operatively connecting said plunger to a relatively movable support.

8. A shock absorber comprising a cylinder adapted for connection to a relatively fixed support, a plunger slidable within said cylinder and provided with a port adapted to permit the passage of air therethrough, a barrel carried by the rear face of said plunger and in communication with said cylinder through said port, said barrel being also provided with an exhaust port at its rear end, valve mechanism in said barrel adapted to control the passage of air through both said ports, means for varying an internal dimension of said barrel, and means for connecting said plunger to a relatively movable support.

9. A shock absorber comprising a cylinder adapted for connection to a relatively fixed support, a plunger slidable within said cylinder and provided with a port adapted to permit the passage of air therethrough, a barrel carried by the rear face of said plunger and in communication with said cylinder through said port, said barrel being also provided with an exhaust port at its rear end, valve mechanism in said barrel adapted to control the passage of air through both said ports, means for varying an internal dimension of said barrel, said means comprising a movable end closure, means for moving said closure relatively to the body of said barrel, and means for connecting said plunger to a relatively movable support.

10. A shock absorber comprising a cylinder having a compression chamber, a plunger adapted for reciprocation within said chamber and carrying a second compression chamber on its rear face, both chambers being in communication through a port in said plunger, a restricted exhaust port in said second chamber, means controlling the passage of air through both ports, and means for connecting said cylinder to a relatively fixed support and for connecting the plunger to a relatively movable support.

In testimony whereof I affix my signature.

FREDERICK R. REIFSNYDER.